(12) United States Patent
Cox

(10) Patent No.: US 10,202,157 B2
(45) Date of Patent: Feb. 12, 2019

(54) METHOD OF MANUFACTURING A MOTOR VEHICLE

(71) Applicant: COXX GROUP B.V., Rijen (NL)

(72) Inventor: René Gerard Marie Cox, Zandhoven (BE)

(73) Assignee: COXX GROUP B.V., Rijen (NL)

( * ) Notice: Subject to any disclaimer, the term of this patent is extended or adjusted under 35 U.S.C. 154(b) by 319 days.

(21) Appl. No.: 15/281,744

(22) Filed: Sep. 30, 2016

(65) Prior Publication Data

US 2018/0093727 A1    Apr. 5, 2018

(51) Int. Cl.
| | |
|---|---|
| *B62D 65/02* | (2006.01) |
| *B62D 21/02* | (2006.01) |
| *B62D 21/12* | (2006.01) |
| *B62D 27/06* | (2006.01) |

(52) U.S. Cl.
CPC ............ *B62D 65/02* (2013.01); *B62D 21/02* (2013.01); *B62D 21/12* (2013.01); *B62D 27/065* (2013.01)

(58) Field of Classification Search
CPC ...... B62D 65/02; B62D 27/065; B62D 21/02; B62D 21/12
See application file for complete search history.

(56) References Cited

U.S. PATENT DOCUMENTS

| | | | | |
|---|---|---|---|---|
| 5,401,056 A | * | 3/1995 | Eastman .................. | B60G 3/20 280/785 |
| 2004/0119276 A1 | * | 6/2004 | Fior ....................... | B62D 21/10 280/781 |
| 2013/0306394 A1 | * | 11/2013 | Theodore ............... | B62D 21/02 180/291 |

* cited by examiner

*Primary Examiner* — Ryan J Walters
(74) *Attorney, Agent, or Firm* — Shewchuk IP Services, LLC; Jeffrey D. Shewchuk

(57) ABSTRACT

A motor vehicle includes:
 a front section comprising
  a front chassis, and
  an engine; and
 a rear section comprising
  a rear chassis, rear chassis beams connected by cross bars.
The motor vehicle is manufactured by a method including a step of connecting the rear chassis to the front chassis. To achieve a relatively light yet strong motor vehicle, left and right of the rear chassis, the cross bars are provided with side profiles, said side profiles comprising an outer first profile section comprising at least one longitudinally extending angled edge.

5 Claims, 12 Drawing Sheets

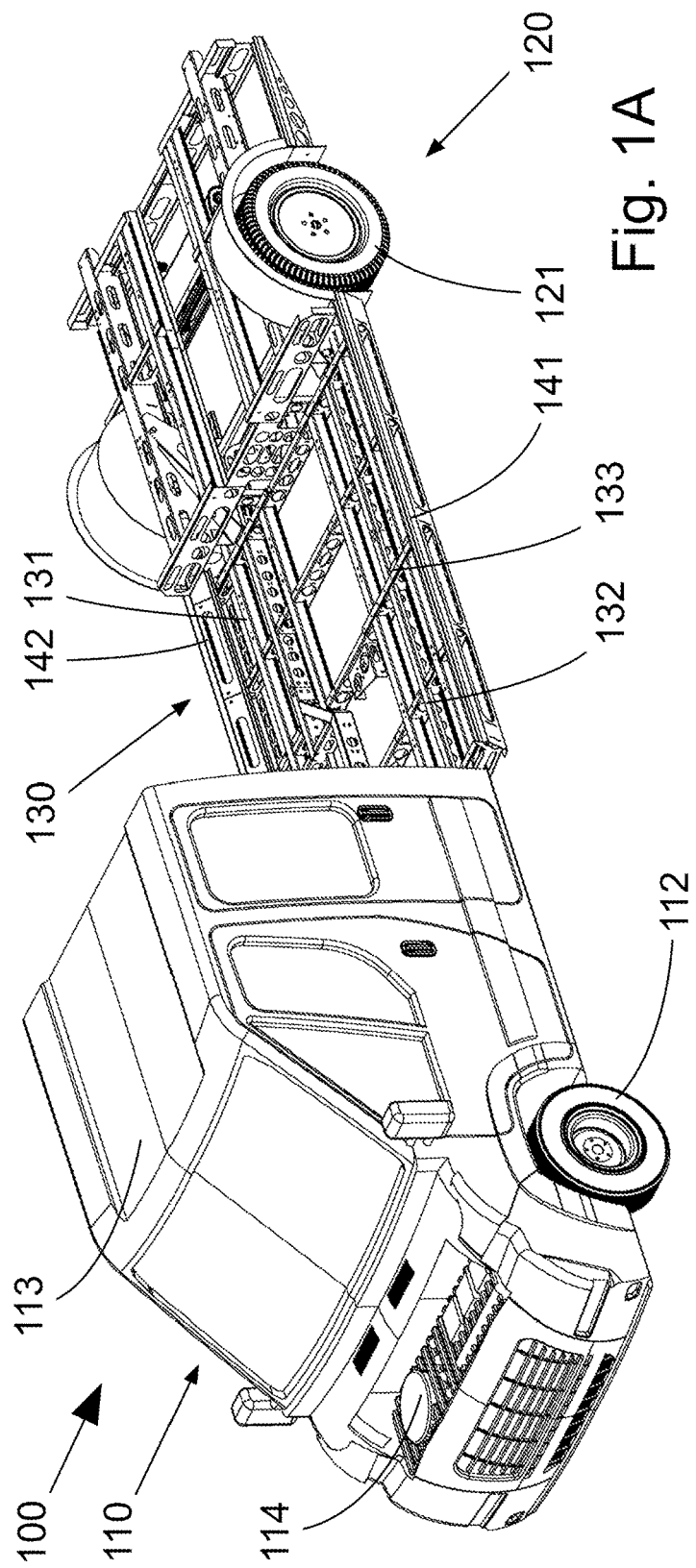

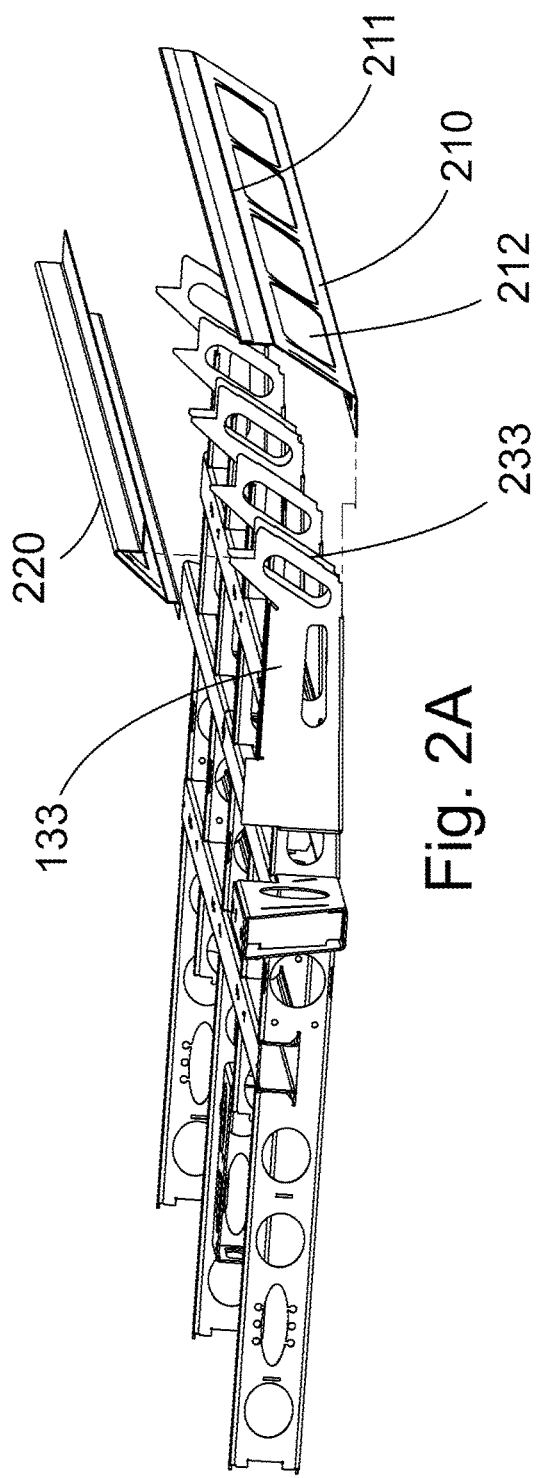
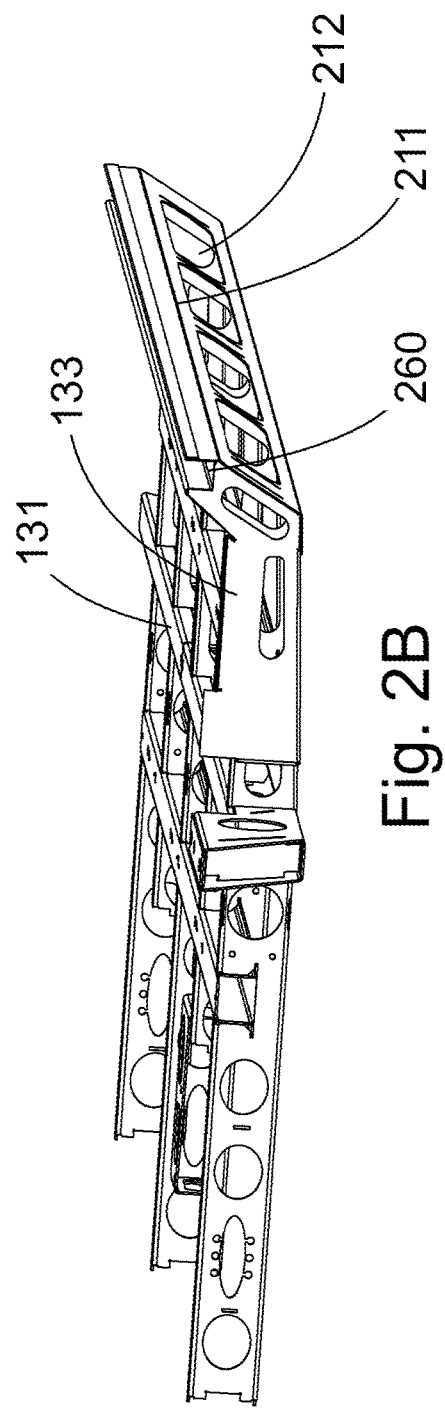
Fig. 2A
Fig. 2B

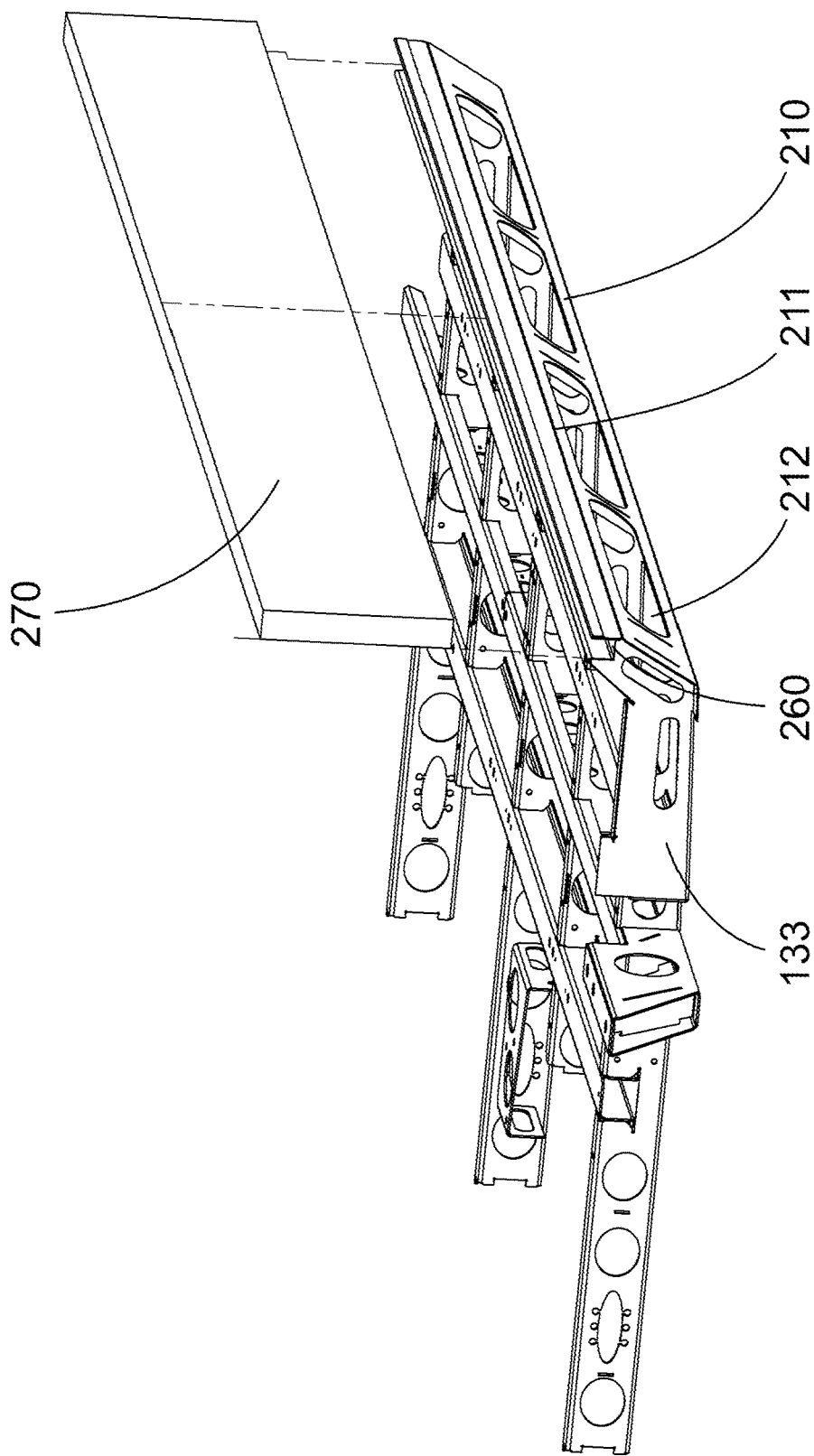

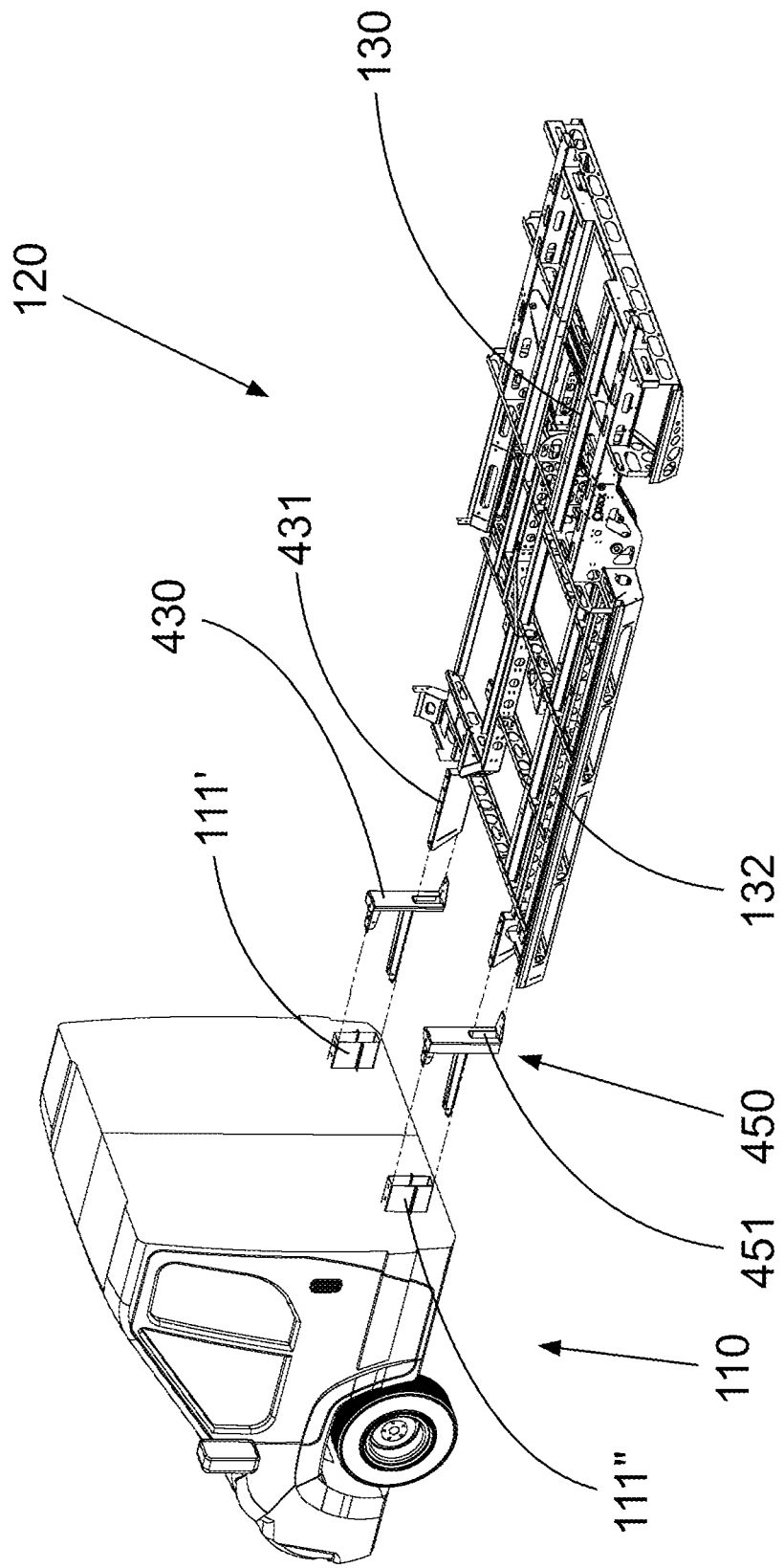

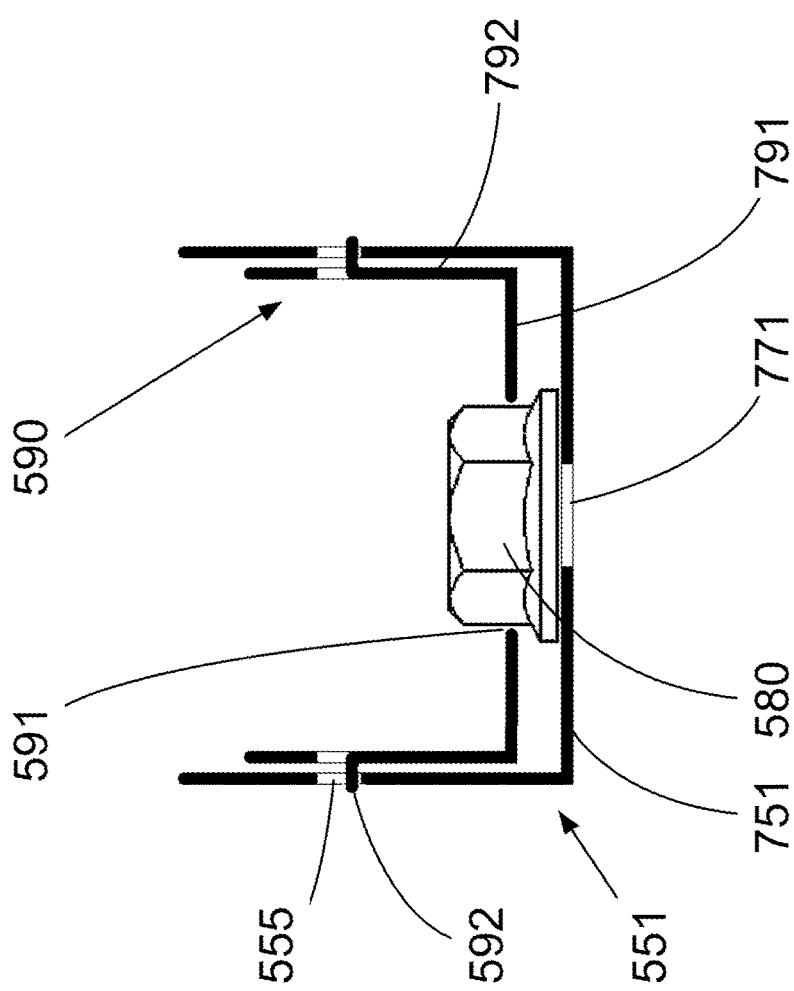

METHOD OF MANUFACTURING A MOTOR VEHICLE

The present invention relates to a method of manufacturing a motor vehicle, the motor vehicle comprising
a front section comprising
a front chassis, and
an engine;
and
a rear section comprising
a rear chassis, comprising
a first longitudinally extending rear chassis beam,
a second longitudinally extending rear chassis beam parallel to said first rear chassis beam, and
a plurality of cross bars connecting the first longitudinally extending rear chassis beam with the second longitudinally extending rear chassis beam;
said method comprising the step of connecting the rear chassis to the front chassis.

BACKGROUND OF THE INVENTION

It is known in the art to manufacture a motor vehicle starting from a commercially available vehicle and cutting off it rear section and replacing it with another rear section. This makes it possible to change the purpose or core-functionality of the vehicle. For example, a light truck may be converted into a multi-passenger vehicle (minibus). Obviously, a sturdy connection between the front section and the rear section has to be achieved, which is achieved in the prior art by welding the rear chassis beams to the front chassis.

After modification, the motor vehicle still has to meet various standards. With the new function, the motor vehicle may also need to satisfy more stringent standards, because passengers of the multi-passenger vehicle are usually not protected by seat belts and/or air bags. For example, in case of conversion to a multi-passenger vehicle, the occupants will have to be protected from side impact collisions, both with respect to damage and to rolling over.

A disadvantage of the known method is that the motor vehicle after modification is relatively heavy.

BRIEF SUMMARY OF THE INVENTION

To this end, a method according to the preamble is characterized in that the rear chassis comprises
a first longitudinally extending side profile, and
a second longitudinally extending side profile;
wherein each of the longitudinally extending side profiles comprises
an outer first profile section comprising at least one longitudinally extending angled edge, and
an inner second profile section facing the outer first profile section;
wherein the method comprises for each of the longitudinally extending side profiles in no particular order
a step of fixing distal ends of the cross bars transversely extending from the rear chassis beams to the outer first profile section, the longitudinally extending angled edge of the outer first profile section facing outwards, and
a step of engaging the inner second profile section and the cross bars at a distance from the distal ends thereof.

Such side profiles are very strong and spread the load over multiple cross bars, allowing the rear chassis to absorb more energy in case of an impact. The rear chassis being very strong by its construction, it can be relatively light for a given side impact collision resistance. The angled edge increases the structural integrity of the outer first profile section, as a result of which loads are transferred to more cross bars.

The step of engaging comprises at least one of i) fixing the inner second profile section to the cross bars at a distance from the distal ends thereof, e.g. by welding, and ii) placing a longitudinally extending subsection of the inner second profile section which subsection is transverse to the main plane of the rear chassis against an edge of the cross bars at a distance from the distal ends thereof, said edge similarly being transverse to the main plane of the rear chassis. Thus the inner second profile section similarly helps to distribute the load over multiple cross bars in case of a side impact.

Being in the form of profiles, the weight is reduced. In addition, this design is stronger than a box beam or the like as an alternative. More specifically for a given weight the side profiles can provide a greater strength and hence improved protection against a side impact compared to box beams attached to the sides of the chassis.

According to a favourable embodiment, the rear chassis comprises a front end section, said front end section comprising
uprights, the uprights being provided with connecting plates parallel to the main plane of the rear chassis, said connecting plates comprising a first connecting plate and a second connecting plate, and
through holes for bolts;
wherein
box beams of the front chassis are provided with through holes for the bolts,
the first connecting plates and second connecting plates are inserted into the box beams of the front chassis, and
front end sections of the longitudinally extending rear chassis beams, the first connecting plates and the second connecting plates are bolted to the box beams of the front chassis.

Thus a strong connection between the rear chassis and the front chassis is provided while at the same time the center of gravity of the rear chassis is relatively low compared to the front chassis, making the vehicle more difficult to topple over, thus improving safety. In general the box beams of the front chassis are the remaining longitudinal sections of the original vehicle after cutting its chassis beams. Each of the first and second connecting plates will have holes for the bolts.

According to a favourable embodiment, the first profile section and second profile section together define a U-shaped subsection, wherein the U-shaped subsections of the longitudinally extending side profiles are provided with upright wall panels.

Thus the longitudinally extending side sections serve a dual purpose, saving weight and facilitating quick and easy construction of the rear section.

According to a favourable embodiment, the first profile section and second profile sections are formed separately and fixed to the cross bars of the rear chassis in separate steps.

Such profiles are easy to form and easy to fix, e.g. by welding, saving cost.

According to a favourable embodiment, the outer profile sections comprise through holes located away from the angled edge, and the step of step of fixing distal ends of the cross bars transversely extending from the rear chassis beams to the outer first profile section comprises inserting the distal ends of the cross beams into said through holes and bonding the distal ends to the outer profile section.

Bonding, e.g. welding, the distal ends of the cross bars can now be done at the side of the outer profile section facing away from the chassis beams. This facilitates the ease of manufacture, reducing cost. The through-holes may be punched or, preferably, laser cut.

Between cross bars, the angled edge of an outer profile section will not be interrupted by a through hole.

BRIEF DESCRIPTION OF THE DRAWINGS

The present invention will now be illustrated with reference to the drawing where FIG. 1A shows a perspective view of a motor vehicle according to the invention under construction;

FIG. 2A to FIG. 2D show a perspective view of a detail of a rear chassis under construction;

FIG. 4A shows perspective exploded rear view of a vehicle and part of a rear chassis.

FIG. 7 shows a schematic cross-sectional view of a part of FIG. 5.

DETAILED DESCRIPTION

Figure 1B:
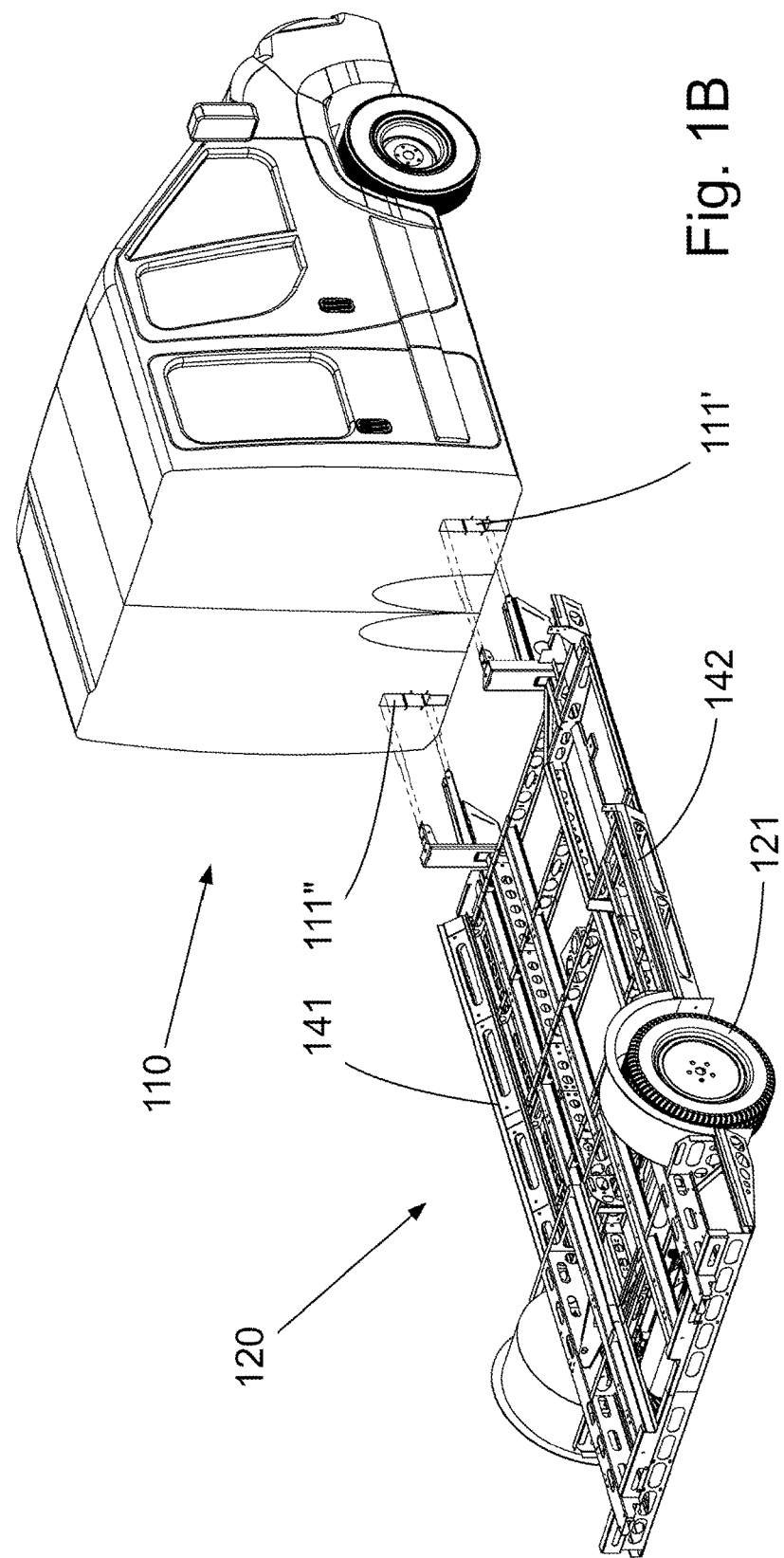
FIG. 1b shows a perspective view of the vehicle of FIG. 1B, the cabin and chassis being separated.
Figure 2D:
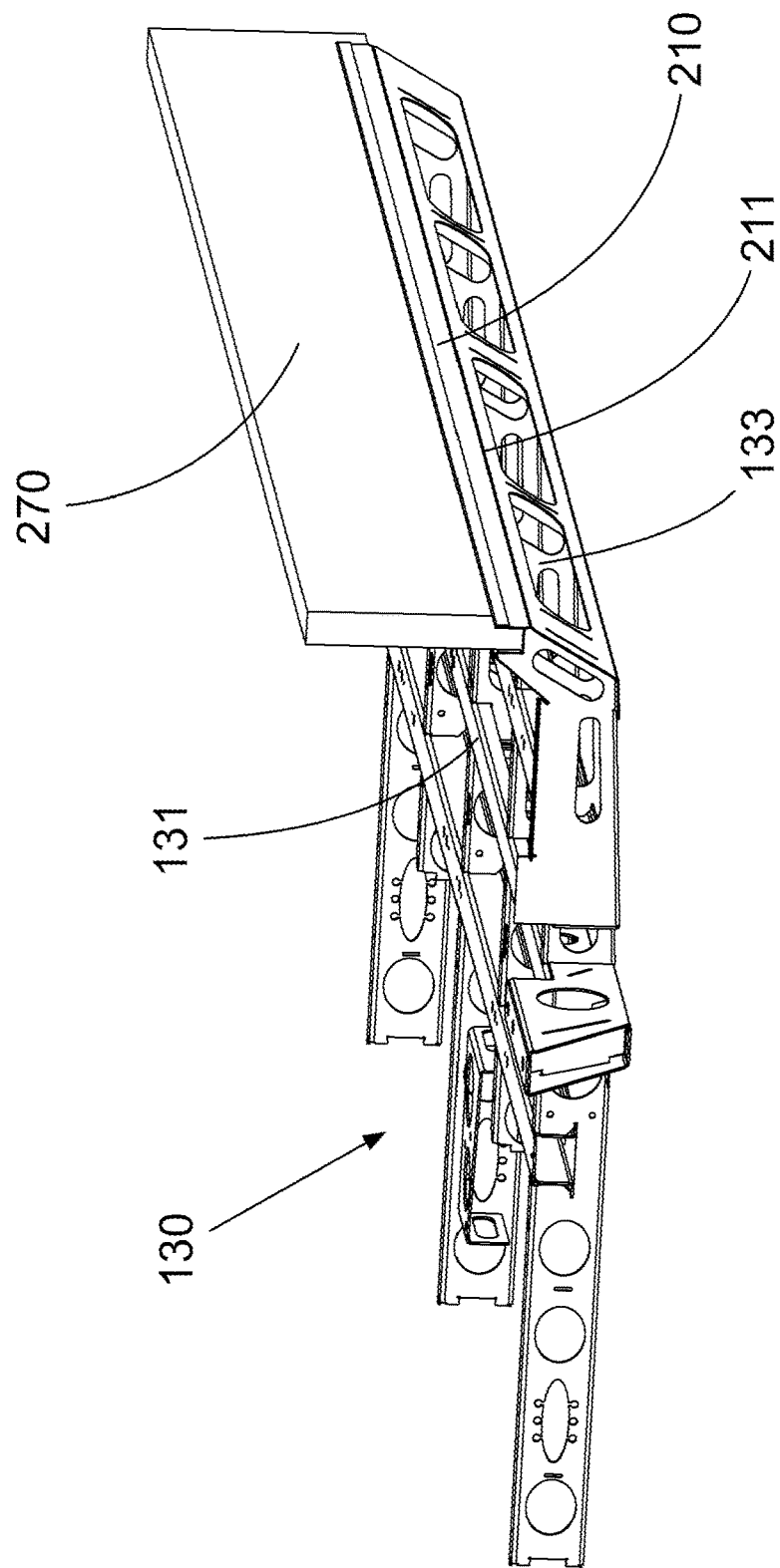
Figure 3A:
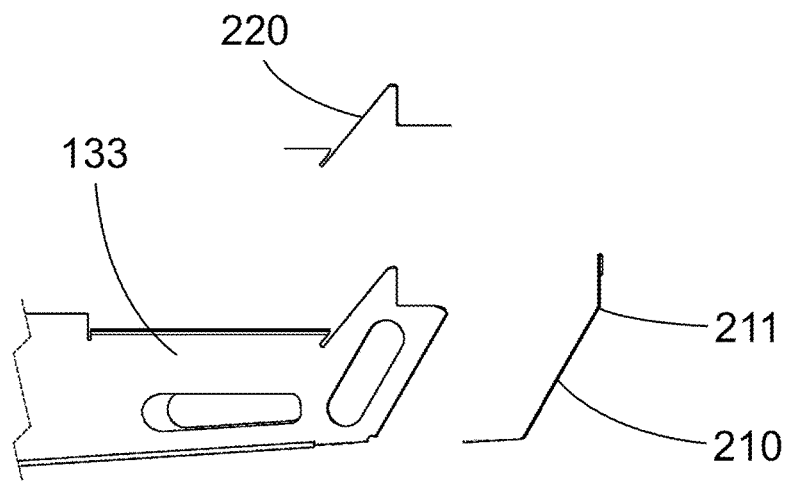
FIG. 3A to FIG. 3D correspond to FIG. 2A to FIG. 2D and show a cross-sectional view of the rear chassis under construction.
Figure 3B:
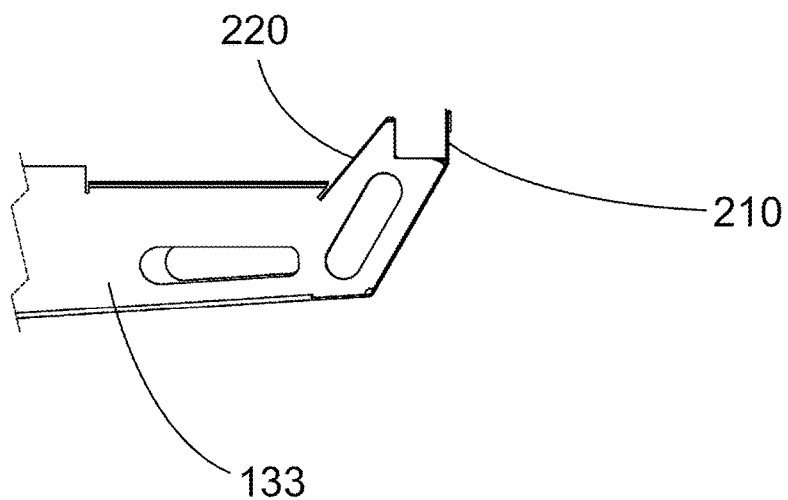
Figures 3C, 3D:
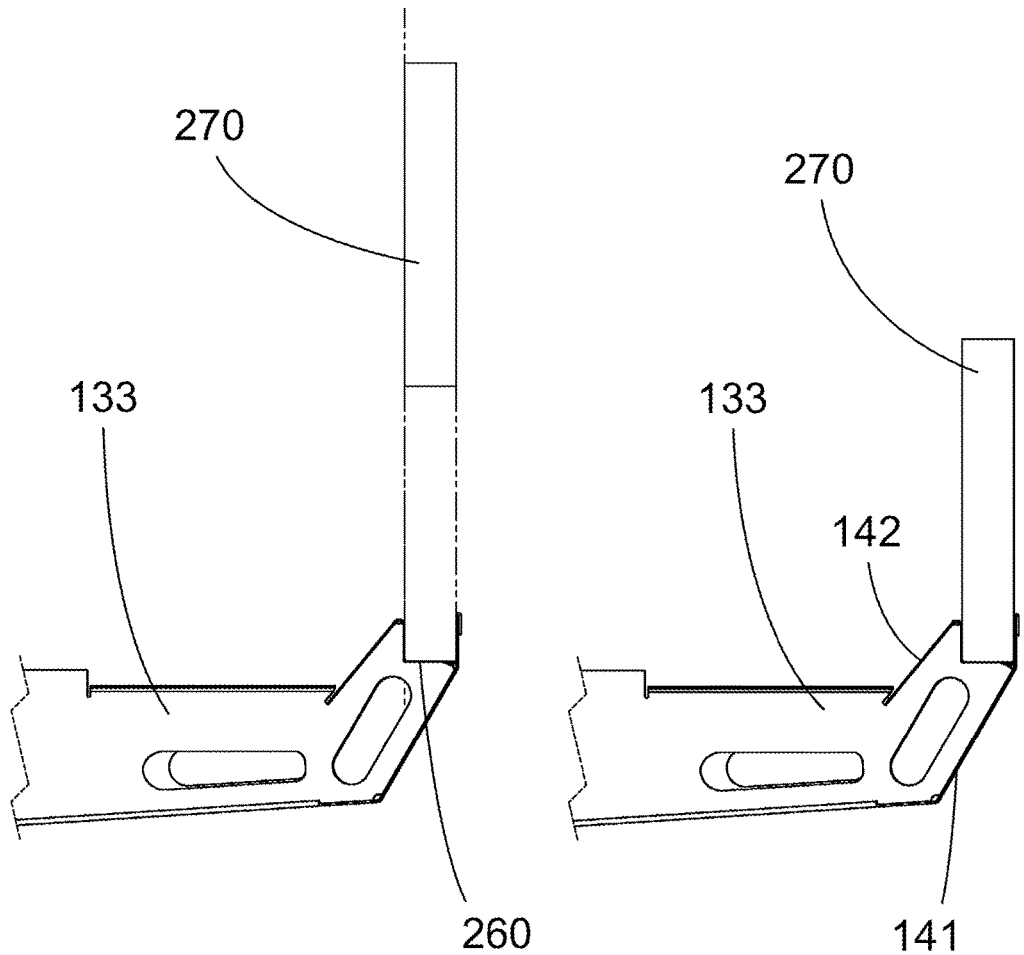

FIG. 1A shows a perspective front view of a motor vehicle 100 according to the invention under construction. FIG. 1B shows said motor vehicle 100 from a perspective rear view.

The motor vehicle 100 comprises a front section 110 comprising a front chassis 111 (front chassis beams 111', 111" shown in FIG. 1B are part of this front chassis 111) provided with front wheels 112, a cabin 113 and an engine 114 for driving the motor vehicle 100.

The motor vehicle 100 also comprises a rear section 120 comprising rear wheels 121 provided to a rear chassis 130.

The rear chassis 130 comprises a first longitudinally extending rear chassis beam 131 and a second longitudinally extending rear chassis beam 132 parallel to said first longitudinally extending rear chassis beam 131. A plurality of cross bars 133 connect the first longitudinally extending rear chassis beam 131 to the second longitudinally extending rear chassis beam 132. Typically, the cross-bars 133 will have an I-beam shaped cross-section.

In FIG. 1B, the rear chassis 130 is shown separated from the front section 110. The vehicle 100 is manufactured by removing the rear section of a chassis of a vehicle, and replacing said rear section with a rear chassis 130 according to the invention. To this end, the front side of the rear chassis 130 is bolted or welded to the front chassis beams 111', 111".

A method and vehicle as described above is known in the art.

For the new function provided by the replacement rear chassis 130, for example the transport of passengers, the rear chassis 130 should have properties not present in the original rear chassis section removed from the front section 110. In particular it side-crash resistance should meet regulatory standards. In accordance with the present invention, this is achieved using a first longitudinally extending side profile 141 and a second longitudinally extending side profile 142, said longitudinally extending side profiles extending along the sides of the rear chassis 130. These are discussed in more detail below.

FIG. 2A to FIG. 2D show a perspective view of a part of the rear chassis 130 of FIG. 1A and FIG. 1B under construction. FIG. 3A to FIG. 3D correspond to FIG. 2A to FIG. 2D and show a crossectional view of the part of the rear chassis 130 of FIG. 1A and FIG. 1B under construction.

A longitudinally extending side profile, here first longitudinally extending side profile 141 comprises an outer first profile section 210 comprising at least one longitudinally extending angled edge 211, and an inner second profile section 220 facing the outer first profile section 210.

In the embodiment discussed here, the outer first profile section 210 and the inner second profile section 220 are separate parts that are placed against distal ends 233 of the cross-bars 133 and welded to said distal ends 233 and along their length to each other. To facilitate welding to the distal ends 233 and to save weight, the outer first profile section 210 comprises openings 212.

In an alternative embodiment the outer first profile section 210 comprises vertically extending slots for receiving the distal ends of the cross-bars, allowing them to be welded more easily.

The angled edge of the outer first profile section 210 faces outward, making it hard to buckle the outer first profile section 210 and allowing a force of a side impact to be transferred to adjacent cross-bars 133 as a result of which the rear chassis 130 will absorb the impact energy which helps to reduce the risk of injury to occupants of the vehicle.

The outer first profile section 210 and the inner second profile section 220 define a U-shaped subsection 260 that extends longitudinally along the side of the rear chassis 130. An upright wall panel 270 is received in said U-shaped subsection 260. This not only results in a reduction in cost because of the simplicity of the design, but also helps to reduce the risk of injury to any passenger of the vehicle 100 because the U-shape is relatively hard to buckle.

FIG. 4A shows perspective exploded rear view of a vehicle 100 and part of a rear chassis 130.

The rear chassis 130 comprises two connecting body 450 which will be discussed in more detail with reference to FIG. 6. The connecting body 450 comprises a through hole 451 for a box profile section 431 of the rear chassis beams. Two connecting body 450 are attached to the two chassis beams before the rear chassis 130 is attacked to the box beams 111", 111' of the front chassis 111.

Figure 4B:
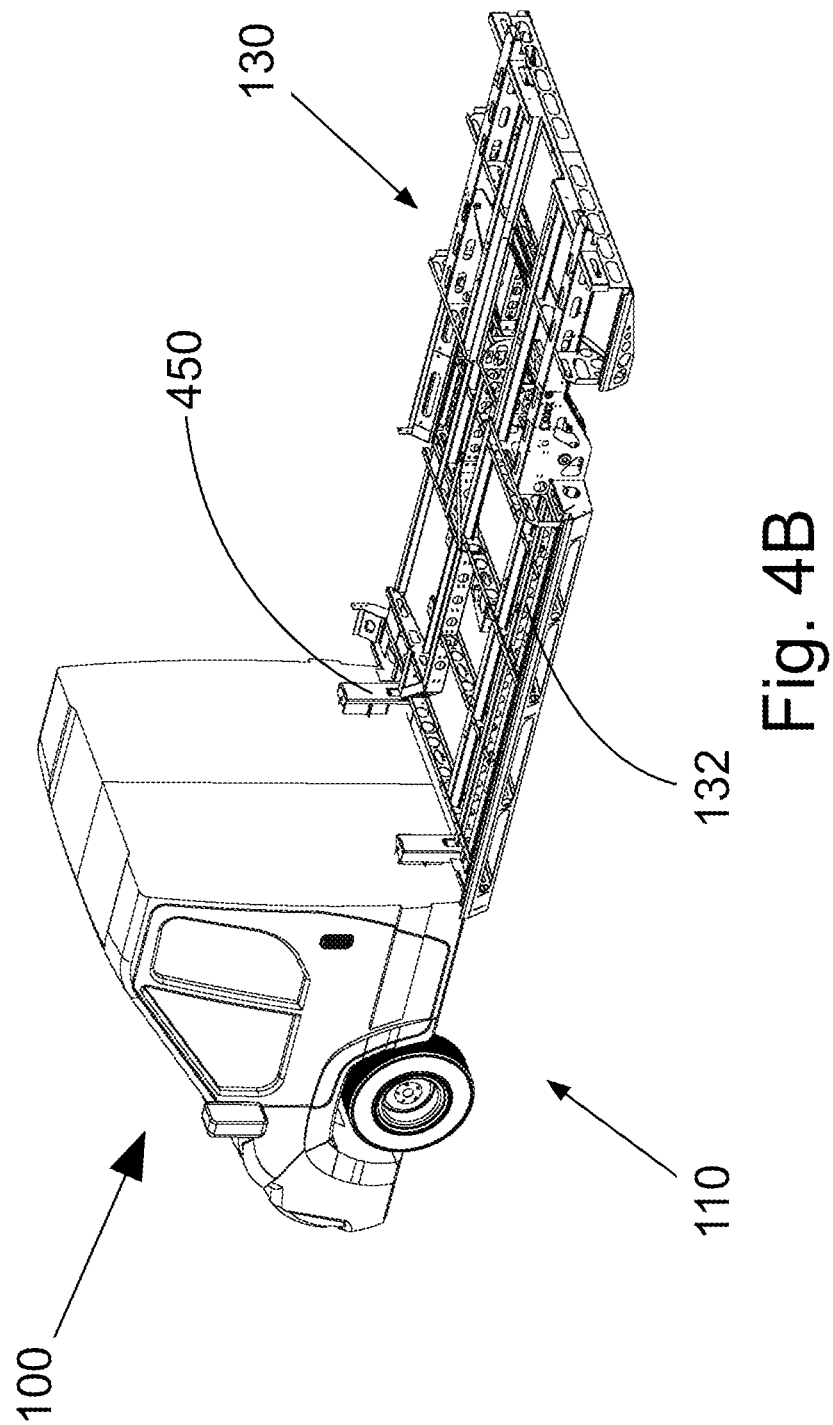
FIG. 4B shows the same view in an assembled state.

FIG. 4B corresponds to FIG. 4A except that it shows the same view with the rear chassis 130 attached to the front section 110.

In FIG. 4A and FIG. 4B the rear wheels are not shown, but in general they will be present when the rear chassis 130 is attached.

Figure 5:
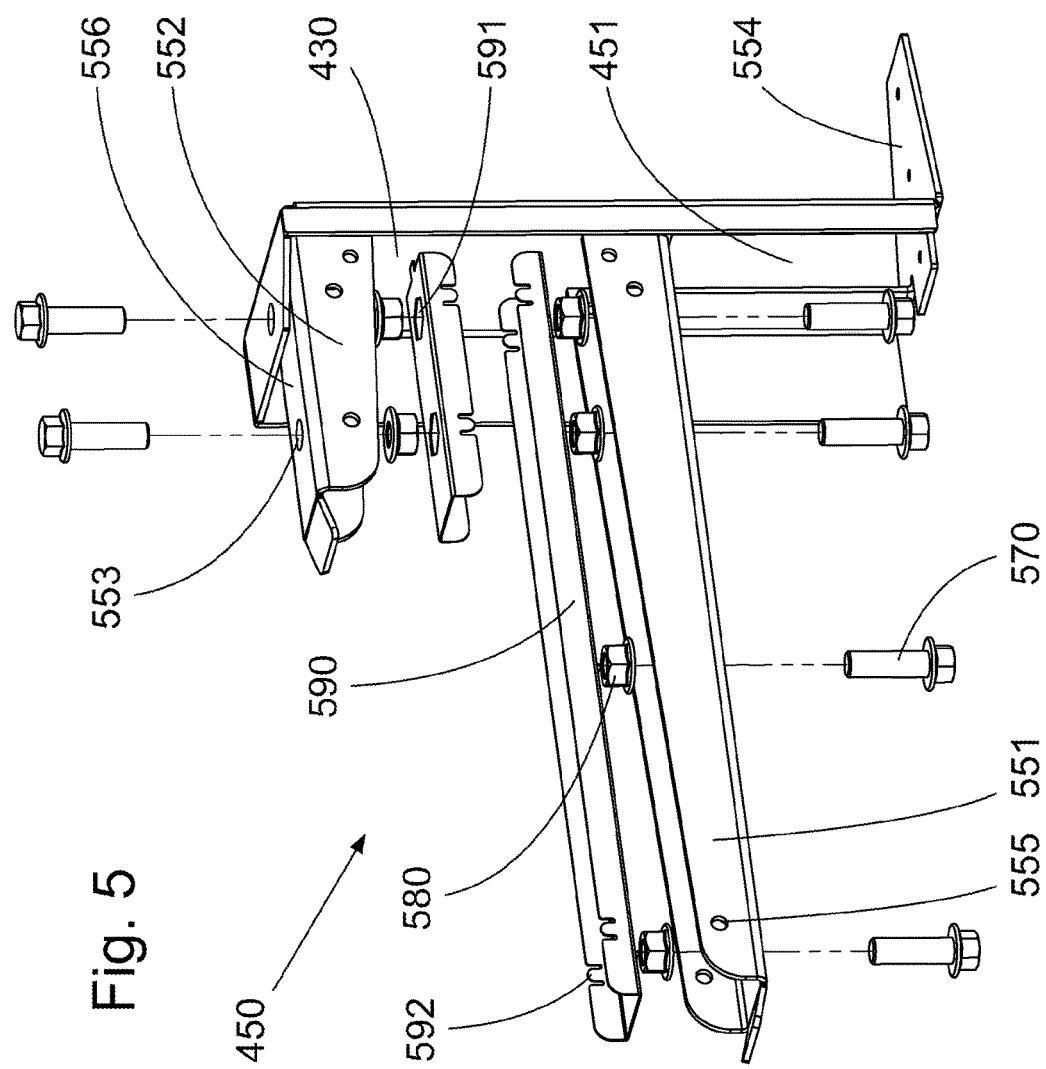
FIG. 5 shows an exploded view of a connecting body.

FIG. 5 shows an exploded view of the connecting body 450 for connecting the rear chassis and the front chassis of the vehicle of FIG. 1A.

End sections 431 of the longitudinally extending rear chassis beams of rear chassis 130 will be passed through the through holes 411 of uprights 430, which will be connected to the front chassis 111 (in particular a box beam 111', 111" thereof). This provides for a relatively low floor which increases the available space for cargo or passengers and/or allows for a low entry height, making entry into the vehicle 100 more comfortable.

The uprights 430 comprise connecting plates transverse to the uprights 430 that will be parallel to the main plane of the rear chassis 130. More specifically, a connecting body 450 comprises a (U-shaped) first connecting profile 551 that comprises a web plate, which web plate is the first connecting plate 751 (see FIG. 7) that will be connected to the box profile section 431 of the chassis beam 131 (or 132), leaving a space between the two for receiving a lower wall of a box beam 111' (or 111") of the front chassis 111.

The connecting body 450 also comprises a (U-shaped) second connecting profile 552, comprising a second web plate of the second connecting profile 552 that serves as the second connecting plate 556.

Both connecting plates comprise holes 553 for bolts 570.

Figure 6:
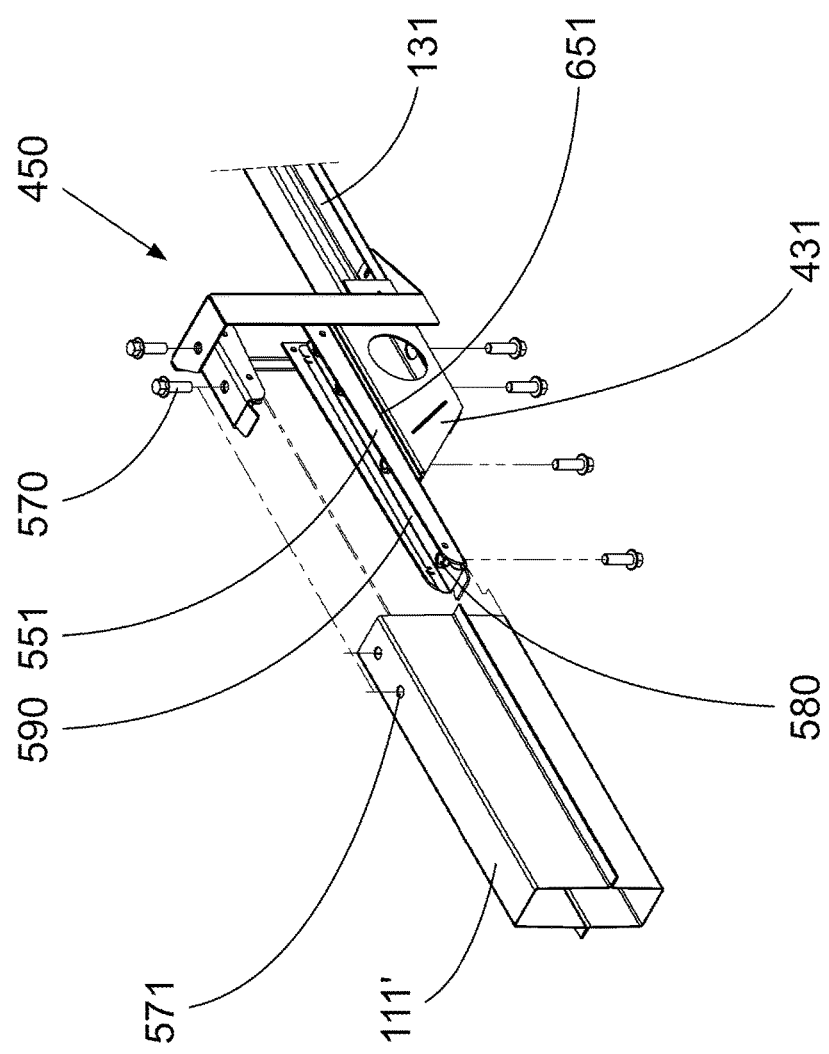
FIG. 6 shows a perspective view of the connecting body of FIG. 5 mounted to a rear chassis beam.

The box beams 111', 111" are provided with corresponding holes 571 (FIG. 6).

To attach the rear chassis 130 as shown FIG. 4A, the first and second connecting profiles 551, 552 are inserted in the box beams 111', 111" and the first connecting plates are bolted to the box profile sections 431 clamping the lower wall of a box beam 111', 111" therein between.

The second connecting profiles 552 are bolted to the upper wall of said box beams 111', 111". This provides for a very sturdy connection. More importantly, this method makes it relatively easy to obtain a proper alignment of the front wheels and the rear wheels, which in itself saves a time and money. To this end, the outer width of a connecting profile, preferably at least the outer width of the first connecting profile, is chosen such that it substantially corresponds to the inner width of the box beam 111', 111" of the front chassis 111.

In the embodiment shown here, the connecting body 450 comprises a flange 554 for bolting the connecting body 450 to the rear chassis beams 131, 132, which allows the connecting body 450 to be attached to said rear chassis beams. The flange 554 does not or not significantly contribute to the strength of the final connection between the front section 110 and the rear section 120.

To make it easy to make the bolt connection, flanged nuts 580 are used, which are held in place using accessory profiles 590. These accessory profiles 590 are provided with unround holes 591 to prevent the flanged nuts 580 from rotating when the bolts 570 are tightened. The accessory profiles 590 do not or not significantly contribute to the strength of the connection between the front section and the rear section.

In the embodiment discussed here, to easily mount the accessory profiles 590, they are provided with lips 592, and opposite walls of the connecting profiles comprises holes 555 for receiving these lips 592 when they are bent.

FIG. 6 shows a perspective view of the connecting body 450 of FIG. 5 mounted to the rear chassis beam 13a. Between the first connecting profile 551 and the box profile section 431 there is a gap 651 for receiving the lower wall of the front box beam 111'.

The outer distance between the first connecting profile 551 and the second connecting profile 552 is chosen such that it corresponds to the inner height of the box beam 111'.

FIG. 7 shows a schematic cross-sectional view of a part of FIG. 5, and in particular a through-hole 771 in a first connecting plate 751 (web) of the first connecting profile 551 for a bolt 570 and the flanged nut 580 held in place by an accessory web 791 of the accessory profile 590.

Walls 792 of the accessory profile 590 comprise the lips 592 which are received in the holes 555 of the first connecting profile, keeping the accessory profiles 590 in place. Thus, when bolts 570 are inserted from below, the flanged nuts 580 are not lifted up, facilitating the quick assembly of the vehicle 100.

For the second connecting profile 552, a corresponding FIG. would look the same, but rotated over 180°.

Although the present invention has been described with reference to preferred embodiments, workers skilled in the art will recognize that changes may be made in form and detail without departing from the spirit and scope of the invention.

The invention claimed is:

1. A method of manufacturing a motor vehicle, the motor vehicle comprising
   a front section comprising
     a front chassis, and
     an engine;
and
   a rear section comprising
     a rear chassis, comprising
       a first longitudinally extending rear chassis beam,
       a second longitudinally extending rear chassis beam parallel to said first rear chassis beam, and
       a plurality of cross bars connecting the first longitudinally extending rear chassis beam with the second longitudinally extending rear chassis beam;
said method comprising the step of connecting the rear chassis to the front chassis;
characterized in that the rear chassis comprises
   a first longitudinally extending side profile, and
   a second longitudinally extending side profile;
wherein each of the longitudinally extending side profiles comprises
   an outer first profile section comprising at least one longitudinally extending angled edge, and
   an inner second profile section facing the outer first profile section;
wherein the method comprises for each of the longitudinally extending side profiles in no particular order
   a step of fixing distal ends of the cross bars transversely extending from the rear chassis beams to the outer first profile section, the longitudinally extending angled edge of the outer first profile section facing outwards, and
   a step of engaging the inner second profile section and the cross bars at a distance from the distal ends thereof.

2. The method according to claim 1, wherein the rear chassis comprises a front end section, said front end section comprising
   uprights, the uprights being provided with connecting plates parallel to the main plane of the rear chassis, said connecting plates comprising a first connecting plate and a second connecting plate, and
   through holes for bolts;
wherein
   box beams of the front chassis are provided with through holes for the bolts,
   the first connecting plates and second connecting plates are inserted into the box beams of the front chassis, and
   front end sections of the longitudinally extending rear chassis beams, the first connecting plates and the second connecting plates are bolted to the box beams of the front chassis.

3. The method according to claim 1, wherein the first profile section and second profile section together define a U-shaped subsection, wherein the U-shaped subsections of the longitudinally extending side profiles are provided with upright wall panels.

4. The method according to claim 1, wherein the first profile section and second profile sections are formed separately and fixed to the cross bars of the rear chassis in separate steps.

5. The method according to claim 1, wherein the outer profile sections comprise through holes located away from the angled edge, and the step of step of fixing distal ends of the cross bars transversely extending from the rear chassis beams to the outer first profile section comprises inserting the distal ends of the cross beams into said through holes and bonding the distal ends to the outer profile section.

* * * * *